July 13, 1954      F. N. BROWN      2,683,610
EXTENSIBLE CASTER MOUNTING FOR BEDS OR THE LIKE
Filed Sept. 4, 1951
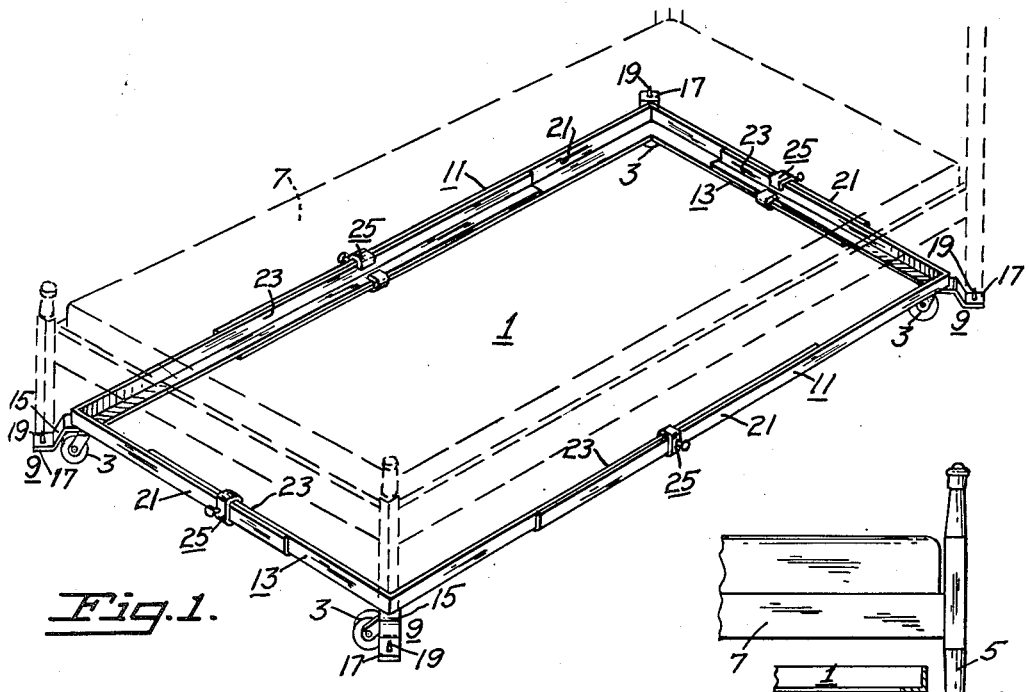
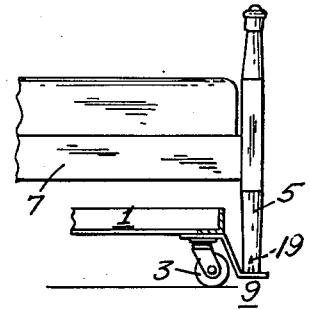
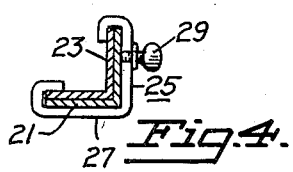
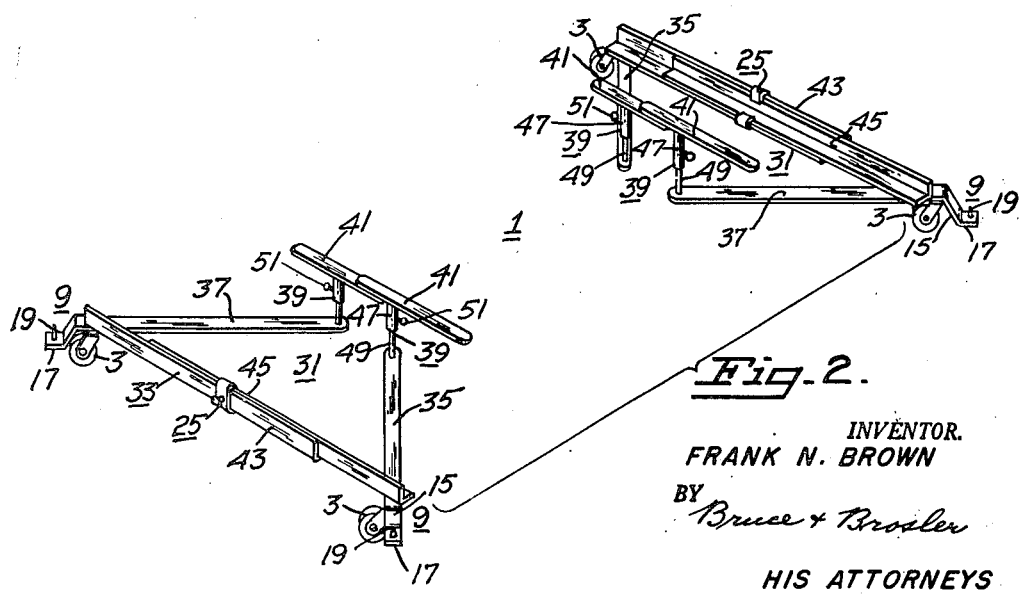
INVENTOR.
FRANK N. BROWN
BY Bruce & Brosler
HIS ATTORNEYS Patented July 13, 1954

2,683,610

UNITED STATES PATENT OFFICE 2,683,610

EXTENSIBLE CASTER MOUNTING FOR BEDS OR THE LIKE

Frank N. Brown, Berkeley, Calif.

Application September 4, 1951, Serial No. 244,887

1 Claim. (Cl. 280—35)

My invention relates to caster mountings for furniture in general, but beds in particular, and will be described in its application thereto.

Among the objects of the present invention are:

(1) To provide a novel and improved caster mounting for beds;

(2) To provide a novel and improved caster mounting for beds, which is independent of the bed supported thereon;

(3) To provide a novel and improved caster mounting for beds, which disposes the casters within the geometrical area defined by the legs of the bed supported thereon;

(4) To provide a novel and improved caster mounting for beds, which may be adjustable within wide limits to conform to beds of different sizes;

(5) To provide a novel and improved caster mounting for beds which permits of the use of large casters to facilitate shifting of the bed over heavily carpeted floors.

Additional objects of my invention will be brought out in the following description of two embodiments of the same, taken in conjunction with the accompanying drawings wherein—

Figure 1 is a three-dimensional view of one embodiment of my invention;

Figure 2 is a three-dimensional view of a second embodiment of the invention;

Figure 3 is a fragmentary view depicting the manner of supporting a bed on the caster mounting of the present invention;

Figure 4 is a view in section, depicting a detail in the construction of the caster mounting of the present invention.

Referring to the drawings for details of my invention, the same, in brief, comprises a frame assembly 1 mounted on casters 3 disposed beneath the frame assembly at points defining a geometrical area corresponding to but slightly less than the geometrical area defined by the supporting legs 5 of the bed 7 to be mounted thereon. The frame assembly includes means 9 for supporting such bed with the rollers located within the area defined by the legs of the bed.

In the embodiment illustrated in Figure 1 of the drawings, the frame assembly includes a rectangular frame formed of side members 11 and end members 13 preferably of angle iron, such frame being mounted on the casters 3 located at the corners thereof.

Extending outwardly from the frame at each corner thereof and included in the frame assembly are the means for supporting the bed on the frame assembly, such means in this instance taking the form of a strip 15 of metal at each corner, which is offset downwardly to provide a platform 17 on which to locate one leg of the bed. Such arrangement leaves the casters disposed within the area defined by the legs, which is an important feature of the present invention, in that the casters are always out of the way of individuals walking in the vicinity, whereby probability of injury due to tripping over the same is thus eliminated. This feature furthermore enables one bed to be moved into side by side contact with an adjacent bed if desired, and this is of particular significance where a common headboard may be employed.

To stabilize the bed on its mounting and forestall slippage from its supports, each of the platforms 17 is provided with an upstanding pin 19 which will dig into the end of the leg resting thereon, or enter the conventional caster hole, if such leg be provided with the same.

In order to adapt the caster mounting so as to accommodate beds of varying sizes, each side and end member of the frame is made up of a pair of slidably interfitting or telescoping angle iron sections 21, 23 which are held in slidable relationship to one another by clamping means 25 involving an angle clip 27 which fits loosely around the telescoping portions of the angle iron sections and includes a thumbscrew 29 threadedly mounted therein and adapted, upon rotation, to exert pressure against such telescoping portions and lock the same in any adjusted position.

In the embodiment of the invention illustrated in Figure 2, the frame assembly involves two sub-frames 31 of like construction, each being adapted to support one end of a bed to the exclusion of the other end.

Each such sub-frame comprises an end member 33 preferably of angle iron, and a pair of inwardly directed, angularly disposed strips 35, 37 welded or otherwise affixed to the ends of the end member, and each carrying at its free end, a post 39, on the upper end of which is affixed a horizontal strip 41 for engagement against the underside of the bed. The bed-supporting means 9 is similar to that of the embodiment of Figure 1, except in this instance, each is formed as an extension of an angularly disposed strip 35, 37.

In employing the sub-frames for the purpose intended, the legs at one end of a bed are placed upon the pins 19 of the supporting means of one of the sub-frames, the weight so applied to such supporting means, causing the post ends of the sub-frame to rise from a normal drop position to bring the post-mounted strips 41 into engagement with the underside of the bed.

To accommodate the embodiment of Figure 2 to beds of different sizes, the end member 33 of each sub-frame is formed of two interfitting or telescoping angle iron sections 43, 45 held together by clamping means 25 of the type described in connection with the embodiment of Figure 1. Inasmuch as there are no side members involved in the frame assembly of this embodiment, any variation in the length of a bed may be taken care of by the spacing between the sub-frames.

It will be apparent that the strips 41 are rotatably adjustable, so that they may, if desired, be so oriented as to span across slats of a bed or cross members of a box spring.

As for accommodating the embodiment of Figure 2 to beds of varying height, the posts 39 are made adjustable by forming each of a sleeve 47 and a rod 49 slidable therein to enable adjustment of the overall length of each post, following which, any adjusted length thereof may be fixed by a thumbscrew 51 threadedly mounted in the sleeve and adapted to engage the rod therein.

From the above description of my invention, it will become apparent that the same fulfills all the objects attributable thereto, and while I have illustrated and described the same in considerable detail, I do not desire to be limited in my protection to such details as I have illustrated and described, except as may be necessitated by the appended claims.

I claim:

A caster mounting for beds or the like, comprising a frame assembly including a pair of separate and independent sub-frames, each sub-frame involving a pair of angularly disposed frame members, means for adjusting the spacing between the more widely spaced ends of said angularly disposed frame members, each such end having a downwardly directed offset to provide a leg support for a bed or the like, a caster under each frame member in proximity to its leg-supporting end to function as a fulcrum when the weight of such bed is applied to said leg supports, and means carried by said members at their opposite ends and extending upwardly for engagement with the underside of such bed in response to the application of such bed weight to said leg supports.

References Cited in the file of this patent

UNITED STATES PATENTS

| Number | Name | Date |
|---|---|---|
| 223,017 | Tucker et al. | Dec. 30, 1879 |
| 1,371,961 | Widmer | Mar. 15, 1921 |
| 1,853,318 | Peters | Apr. 12, 1932 |
| 2,446,023 | Pohl | July 27, 1948 |
| 2,480,025 | Hunter | Aug. 23, 1949 |